US011868990B2

(12) United States Patent
Sarin

(10) Patent No.: US 11,868,990 B2
(45) Date of Patent: Jan. 9, 2024

(54) MULTI-TENANTS PAYMENT REFRESH TOKENS

(71) Applicant: PAYPAL, INC., San Jose, CA (US)

(72) Inventor: Pankaj Sarin, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 99 days.

(21) Appl. No.: 17/003,682

(22) Filed: Aug. 26, 2020

(65) Prior Publication Data
US 2022/0067703 A1    Mar. 3, 2022

(51) Int. Cl.
*G06Q 20/36* (2012.01)
*G06Q 20/10* (2012.01)
*G06Q 20/40* (2012.01)
*H04L 9/32* (2006.01)

(52) U.S. Cl.
CPC ......... *G06Q 20/363* (2013.01); *G06Q 20/102* (2013.01); *G06Q 20/3674* (2013.01); *G06Q 20/4016* (2013.01); *H04L 9/3213* (2013.01); H04L 2209/56 (2013.01)

(58) Field of Classification Search
USPC ........................................................ 705/40
See application file for complete search history.

(56) References Cited

U.S. PATENT DOCUMENTS

| | | | | |
|---|---|---|---|---|
| 10,839,376 | B1 * | 11/2020 | Kurani et al. ......... | G06Q 20/36 |
| 10,878,406 | B2 * | 12/2020 | Dao et al. .............. | G06Q 20/36 |
| 10,878,407 | B1 * | 12/2020 | Spector et al. ........ | G06Q 40/00 |
| 11,062,319 | B1 * | 7/2021 | Hecht et al. ........... | G06Q 40/00 |
| 2015/0252664 | A1 * | 9/2015 | Bondesen et al. ..... | G06Q 20/40 |
| 2015/0254647 | A1 * | 9/2015 | Bondesen et al. ..... | G06Q 20/36 |
| 2017/0032365 | A1 * | 2/2017 | Liberty et al. ......... | G06Q 20/36 |
| 2017/0140350 | A1 * | 5/2017 | Jamkhedkar et al. . | G06Q 20/10 |
| 2017/0161733 | A1 * | 6/2017 | Koletsky et al. ...... | G06Q 20/38 |
| 2018/0082284 | A1 * | 3/2018 | Gomes et al. ......... | G06Q 20/36 |
| 2020/0027078 | A1 * | 1/2020 | Kallugudde et al. .. | G06Q 20/36 |
| 2020/0193417 | A1 * | 6/2020 | Dao et al. .............. | G06Q 20/36 |

OTHER PUBLICATIONS

CFI Team, Digital Wallet—Overview, Significance, Examples, Types, Sep. 11, 2020 (Year: 2020).*
Rod Garratt et al., Token or Account Based ? A Digital Currency Can Be Both, Aug. 12, 2020, Liberty Street Economics, The Federal Reserve Bank of New York. (Year: 2020).*
Visa, Digital Wallets in Visa's Ecosystem, Nov. 30, 2020, Visa.com, Visa Confidential, pp. 1-14. (Year: 2020).*

* cited by examiner

*Primary Examiner* — Bennett M Sigmond
*Assistant Examiner* — George N. Proios
(74) *Attorney, Agent, or Firm* — Haynes and Boone, LLP

(57) ABSTRACT

Methods and systems are presented for facilitating sharing of tokens among different funding accounts linked to a digital wallet application to improve the computer resource efficiency of the mobile device. When a first funding account is linked to the digital wallet application is received, a token management system may determine whether a set of tokens have already been issued and stored on the mobile device for another related funding account. The token management system may cause a token service provider server to abort generating additional tokens for the first funding account. Instead, the token management system may modify characteristics of one or more of the set of tokens existed on the mobile device, to enable the one or more existing tokens to be usable in electronic payment transactions in association with the first funding account or the second funding account.

20 Claims, 8 Drawing Sheets

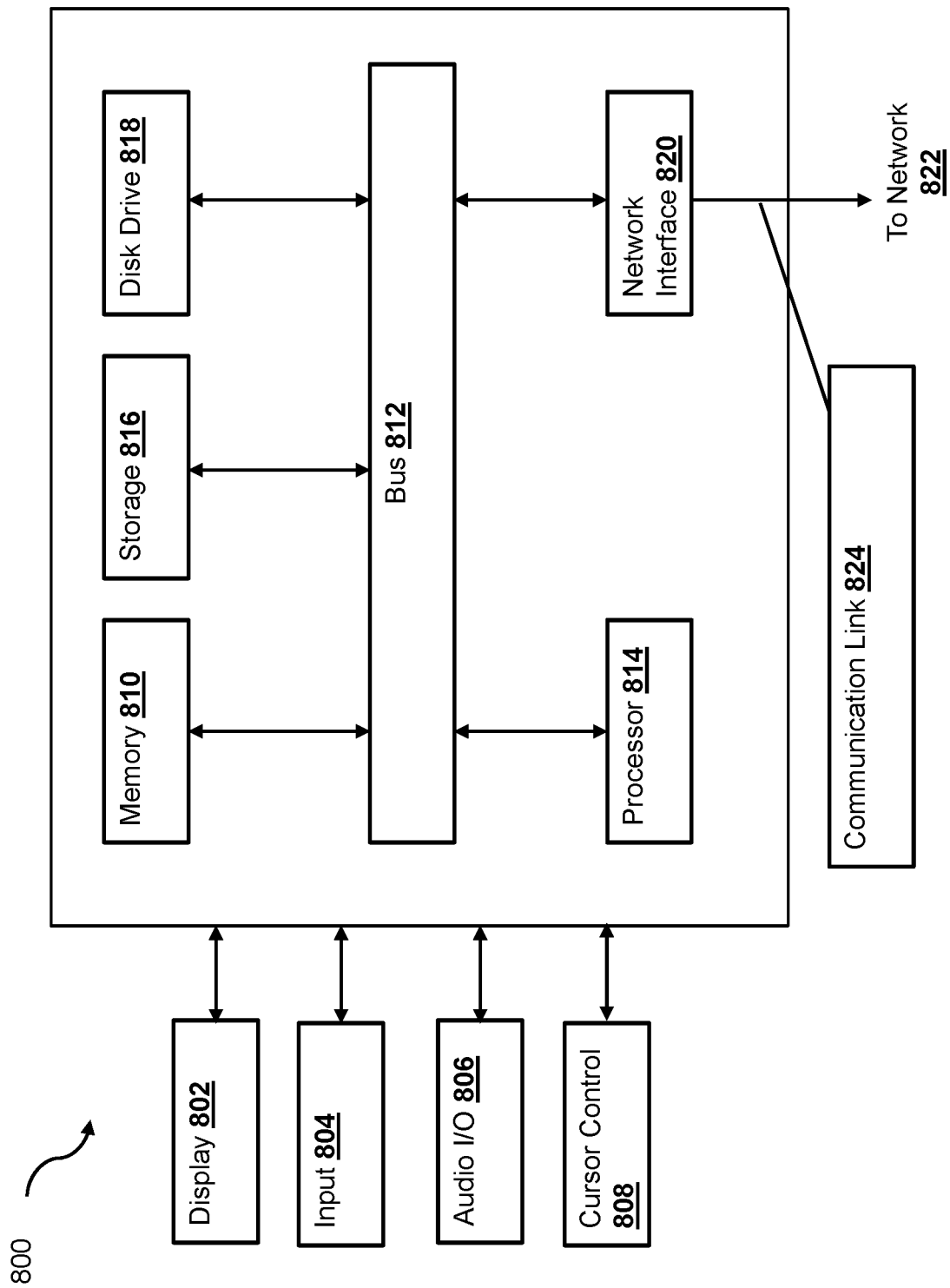

MULTI-TENANTS PAYMENT REFRESH TOKENS

BACKGROUND

The present specification generally relates to digital transaction platforms, and more specifically, to facilitating token-based mobile digital transaction processing according to various embodiments of the disclosure.

Related Art

Mobile applications, such as digital wallet applications, enable mobile computing devices to perform electronic transactions based on one or more funding accounts or sources (e.g., credit cards, debit cards, bank accounts, gift cards, etc.) that are linked to the applications. For example, a digital wallet application may enable a user to link different funding accounts to the digital wallet application. By linking the funding accounts to the digital wallet application, the digital wallet application may store data associated with the funding accounts or sources (e.g., credit card numbers, bank account numbers, gift card numbers, etc.) to be used in electronic payment transactions.

In order to avoid transmitting sensitive data (e.g., the funding source data) over the Internet during the processing of the electronic payment transactions, the funding source data may be tokenized. For example, various one-time use tokens may be generated and used for electronic payment transactions. However, storing and managing tokens for the various funding accounts or sources linked to the digital wallet application can be inefficient and burdensome, especially when the number of funding accounts or sources linked to the digital wallet application is large. Thus, there is a need for an efficient way to store and manage tokens for a digital wallet application.

BRIEF DESCRIPTION OF THE FIGURES

FIG. 8 is a block diagram of a system for implementing a device according to an embodiment of the present disclosure.

Figure 1:
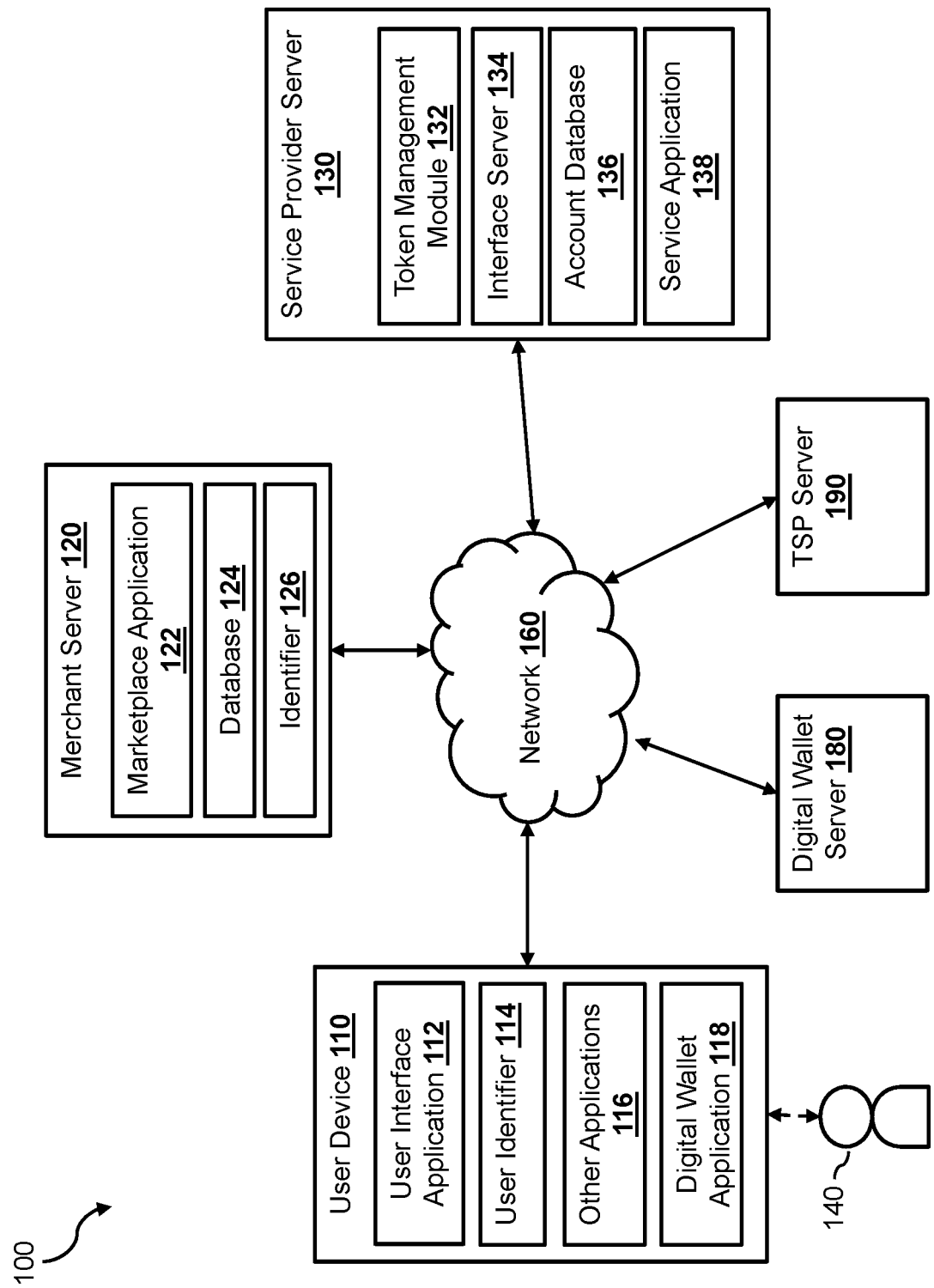
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for managing electronic tokens for a digital wallet application. As discussed above, instead of using funding source or account data (e.g., card number, bank account number, gift card numbers, etc.) in processing an electronic payment transaction, tokens (also referred to as "payment tokens") that represent encoded versions of the funding source or account data may be used instead to enhance data security for digital wallet applications. A digital wallet application of a mobile device may enable a user to link one or more funding sources or accounts (e.g., credit cards, debit cards, bank accounts, gift cards, etc.) to the digital wallet application. By linking the one or more funding sources or accounts to the digital wallet application, the user may provide to the digital wallet application funding account or source data associated with each of the one or more funding sources or accounts, (e.g., card number or account number, expiration data, security code, billing address, name, etc.). The digital wallet application may store the funding account or source data on the mobile device and/or on a server associated with the digital wallet application. As used herein in different embodiments, "funding account" refers to any type of funding instrument or source, including one-time use value, such as gift cards, store credit, or rebates, that allows the "funding account" to be used for full or partial payment of a transaction.

In order to avoid transmitting the funding account data during the processing of electronic payment transactions, the funding account data may be tokenized (e.g., by the digital wallet application, a digital wallet server, a token service provider server). For example, tokens may be generated for each of the one or more funding accounts to be used in electronic payment transactions in association with the one or more funding accounts. A token may include encrypted data that represent the funding account data of the corresponding funding account. With a proper encryption key, the token may be decrypted or detokenized (e.g., by a payment server, etc.) to obtain the funding account data, but any malicious users who intercepts the token without the encryption key will not have access to the funding account data. In some embodiments, the tokens are single-use tokens that can only be used once to further enhance security of the funding accounts.

The tokens may be stored on the mobile device to be used in electronic payment transactions conducted through the mobile device. In some embodiments, when the digital wallet application receives a request from a user to link a new funding account (e.g., a new credit card, etc.) to the application, additional tokens may be generated for the new funding account and stored on the mobile device to be used in future electronic payment transactions in association with the new funding account. To ensure that sufficient number of tokens are available for the funding accounts, multiple tokens (e.g., 10, 20, etc.) may be issued and stored on the mobile device for each funding account. Since the tokens may be single-use tokens, each time an electronic payment transaction is processed using a token, the token is discarded from the mobile device (or rendered unusable). When the number of tokens associated with a funding account is depleted (e.g., below a threshold number such as 2), the digital wallet application may issue (or may cause the token service provider server to issue) a new set of tokens for the funding account.

When multiple funding accounts are linked to the digital wallet application, the number of tokens stored on the mobile device can become substantially large. For example, when five funding accounts are linked to the digital wallet application and 10 tokens are issued for each of the funding account, the digital wallet application may store 50 tokens on the mobile device. Storing and managing a large number of tokens can take up enormous computing resources of the mobile device. For example, memory space has to be allocated for storing the tokens and associated data (e.g., metadata), for example, in a token database. Furthermore, computing power is required to query the token database, to analyze the tokens, and to select a token for an electronic payment transaction. In general, the more tokens are stored on the mobile device, the more computing resources are required by the mobile device to manage the tokens, which is especially important due to the smaller sizes of mobile computing devices.

Thus, according to various embodiments of the disclosure, a token management system may facilitate sharing of tokens among different funding accounts linked to a digital wallet application to improve the computer resource efficiency of the mobile device. In some embodiments, when an indication of adding a first funding account to the digital wallet application is received, the token management system may determine whether a set of tokens have already been issued and stored on the mobile device for another related funding account (e.g., a second funding account). For example, the set of tokens may have been generated and stored on the mobile device in response to a previous request to link the second funding account to the digital wallet application. The second funding account may be related to the first funding account. For example, the first funding account may be associated with a user and with a first payment service provider while the second funding account may be associated with the same user but with a second payment service provider. The token management system may determine that the first funding account and the second funding account are related based on a relationship between the first payment service provider and the second service provider (e.g., a partnership relationship, an affiliation relationship, etc.). In another example, the first payment service provider and the second service provider are related to each other when the first and second payment service providers share transaction data associated with funding accounts with the first and second payment service providers in a common data structure.

When it is determined that the set of tokens have been issued and stored for a related funding account (e.g., the second funding account), the token management system may cause the digital wallet application, the digital wallet server, or the token service provider server to abort generating (e.g., issuing) additional tokens for the first funding account. Instead, the token management system may modify characteristics of one or more of the set of tokens existing on the mobile device, to enable the one or more existing tokens to be usable in electronic payment transactions in association with the first funding account or the second funding account.

In some embodiments, the token management system may modify the characteristics of a token by changing the associated data (e.g., metadata) of the token. For example, each token that is generated and stored on the mobile device may be associated with metadata. The associated metadata may indicate a token identifier of the token, one or more funding account identifiers of one or more funding accounts that are associated with the tokens, one or more restrictions specifying conditions in which the token may be used, a device identifier of the mobile device, and other information related to the token. In some embodiments, the associated metadata may be attached/appended to the token itself. In some embodiments, however, the associated metadata may be stored in a data structure separate from the token (e.g., a database, a table, etc.). Thus, the token management system may first lock the tokens to be modified (e.g., the one or more of the set of tokens) stored on the mobile device such that those tokens cannot be used during the modification. The token management system may then modify the characteristics of a token by changing the data associated with the token. For example, the token management system may add the funding account identifier of the first funding account to the metadata associated with the token to enable the token to be used in electronic payment transactions in association with either the first funding account or the second funding account.

In some embodiments, the token management system may determine a number of tokens among the set of tokens issued for the second funding account to be sharable with the first funding account. In some embodiments, the token management system may determine that the entire set of tokens issued for the second funding account is sharable with (that is, linked or otherwise correlated with) the first funding account. In some embodiments, the token management system may determine that only a subset of the set of tokens issued for the second funding account is sharable with the first funding account. For example, the token management system may analyze a transaction history of the user with respect to using the first funding account and the second funding account over a period of time (e.g., the past 6 months, the past year, etc.). In some embodiments, the token management system may determine a ratio of past transactions conducted by the user through the first funding account and the second funding account and may determine the number of tokens to be shared between the first funding account and the second funding account according to the ratio. For example, if the token management system determines that twice as many transactions conducted by the user were through the second funding account than the first funding account, the token management system may determine that only half of the set of tokens issued for the second funding account are shared with the first funding account. The token management system may then add the funding account identifier of the first funding account to the metadata of half of the set of tokens.

In another example, if the token management system determines that twice as many transactions conducted by the user were through the first funding account than the second funding account, the token management system may determine that more tokens (e.g., twice as many tokens) should be allocated for the first funding account than for the second funding account. In this situation, the token management system may convert at least some of the existing tokens (e.g., 5 out of the 10 existing tokens) from being associated with the second funding account to the first funding account, and may modify the characteristics of the remaining tokens (e.g., the remaining 5 existing tokens) to be shared between the first funding account and the second funding account. Thus, the token management system may remove the funding account identifier of the second funding account from the metadata associated with half of the set of tokens and may add the funding account identifier of the first funding account to the metadata associated with the entire set of tokens.

In some embodiments, each token generated for a funding account may be associated with a set of restrictions that specifies conditions in which the token can be used (and cannot be used) in an electronic payment transaction. Example restrictions may include a maximum amount in an electronic payment transaction, a geographical region in which the electronic payment transaction is conducted, a specific time range during which the electronic payment transaction is conducted a transaction type (e.g., in-store transactions, online transactions, etc.), or any other types of restrictions. For example, when the set of tokens were generated for the second funding account, a set of restrictions may be determined for the set of tokens (e.g., by the digital wallet application, the digital wallet server, or the token management system). The set of restrictions may be determined based on a transaction history (e.g., past transactions that were conducted through the second funding account). In some embodiments, different sets of restrictions may be determined for different tokens in the set of tokens. For example, one token may only be used for transactions that are below $500 while another token may only be used for in-store transactions.

In some embodiments, in response to the indication of adding the first funding account to the digital wallet application, the token management system may determine restrictions for the tokens associated with the first funding account (e.g., a maximum amount, a geographical region, a transaction type, etc.). In some embodiments, the token management system may determine the restrictions based on a transaction history of the user (e.g., past transactions conducted through the first funding account). For example, when all (or most) of the past transactions conducted through the first funding account were in-store transactions, the token management system may determine an in-store transaction restriction for the tokens assigned to the first funding account. When all (or most) of the past transactions conducted through the first funding account were below $1,000, the token management system may determine a maximum amount of $1,000 restriction for the tokens assigned to the first funding account. The token management system may then insert the restrictions to the metadata associated with the tokens assigned to the first funding account, which may include tokens that are shared between the first funding account and the second funding account as discussed herein.

In some embodiments, the token management system may allow different restrictions to be associated with different funding accounts for a token. Thus, for a token (will also be referred to as a "multi-tenant token") that is shared between (or linked to both) the first funding account and the second fund account, and that already has a restriction (e.g., a maximum amount of $500) associated with the second funding account, the token management system may add another restriction (e.g., in-store transaction only restriction) associated with the first funding account to the metadata of the token. The feature of allowing different restrictions to be associated with different funding accounts for a token enable different restrictions to be applied for transactions when the token is used for different funding accounts. Thus, when the multi-tenant token is used in an electronic payment transaction in association with the first funding account, the electronic payment transaction may be approved or denied based on the restriction associated with the first funding account (e.g., whether the transaction is an in-store transaction). Similarly, when the multi-tenant token is used in an electronic payment transaction in association with the second funding account, the electronic payment transaction may be approved or denied based on the restriction associated with the second funding account (e.g., whether the transaction amount is below $500).

In some embodiments, the token management system may dynamically modify the restrictions associated with a funding account for a multi-tenant token while the multi-tenant token is being used in an electronic payment transaction. For example, when the user initiates an electronic payment transaction via the digital wallet application using the first funding account, the digital wallet application may select, from the tokens stored on the mobile device, a token (which can be a multi-tenant token) that is associated with the first funding account. The digital wallet may analyze the metadata of the token to determine whether the electronic payment transaction complies with the restriction(s) associated with the first funding account. When the digital wallet application determines that the electronic payment transaction does not comply with the restriction specified in the metadata, the digital wallet application may transmit a soft decline message (e.g., an error, an exception, etc.) to the token management system.

Upon receiving the soft decline message from the digital wallet application, the token management system may determine a cause for the non-compliance (e.g., the transaction amount is above the threshold, the transaction is an online transaction instead of an in-store transaction, etc.) based on the soft decline message. The token management system may also determine whether to modify the restriction of the token associated with the first funding account based on the cause for the non-compliance and attributes associated with the underlying electronic transaction request. For example, the token management system may determine a risk for the electronic transaction request based on the attributes associated with the electronic transaction request (e.g., location of the transaction, identity of the merchant, product and/or service associated with the transaction, a time of the day, etc.). In some embodiments, the token management system may use a machine learning model that is trained based on past transaction conducted through the first funding account to determine the risk of the electronic transaction request. When the risk is below a threshold, the token management system may modify the restrictions for the token in association with the first funding account, such that the electronic transaction request may be processed using the token. In some embodiments, the token management system may modify the restrictions for the token used in the electronic payment transaction only. In some embodiments, based on the determination that the electronic payment transaction has a risk below the threshold, the token management system may modify the restrictions for all tokens associated with the first funding account stored on the mobile device (e.g., increase the maximum amount threshold, removing the transaction type restriction, etc.).

When multiple tokens can be used in transactions in association with a funding account (e.g., the first funding account), the token management system may select, among the tokens, a particular token for use in an electronic payment transaction upon receiving a request. Depending on how the tokens were modified and/or allocated by the token management system, some of the tokens may be multi-tenant tokens that are shared (or linked) with one or more other funding account (e.g., the second funding account) while some other tokens can be used only in association with the first funding account. Furthermore, different tokens may be associated with different restrictions. Thus, in some embodiments, to select the particular token for use in the electronic payment transaction, the digital wallet application and/or the token management system may first select a subset of tokens having restrictions satisfied by the electronic payment transactions. In some embodiments, the digital wallet application and/or the token management system may have a preference of selecting a single-tenant token instead of a multi-tenant token for use in the electronic payment transaction, if possible. Thus, the digital wallet application and/or the token management system may determine whether the subset of tokens includes a single-tenant token and may select a single-tenant token for use in association with the electronic payment transaction if the subset of tokens includes one. The digital wallet application and/or the token management system may select a multi-tenant token when no single-tenant token exists in the subset of tokens.

FIG. 1 illustrates an electronic transaction system 100, within which the token management system may be implemented according to one embodiment of the disclosure. The electronic transaction system 100 includes a service provider server 130, a merchant server 120, a digital wallet server 180, a token service provider (TSP) server 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120, the digital wallet server 180, and/or the service provider server 130 over the network 160. For example, the user 140 may use the device 180 and/or the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, includes a digital wallet application 118, which may be downloaded from the digital wallet server 180. Example digital wallet applications may include Google Pay®, Apple Pay®, etc. The user 140 may link one or more funding accounts (e.g., a credit card account, a bank account, a payment service provider account, gift cards, etc.) to the digital wallet application 118. After linking the funding accounts to the digital wallet application 118, the user 140 may use the digital wallet application 118 to facilitate electronic payments with other entities, such as the merchant server 120. In one implementation, the user interface application 118 includes a software program (e.g., a mobile application) that provides a graphical user interface (GUI) for the user 140 to interface and communicate with the digital wallet server 180 via the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 and/or the digital wallet application 118 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 or the digital wallet server 180 via the network 160, and the identifier 114 may be used by the service provider server 130 and/or the digital wallet server 180 to associate the user with a particular user account (e.g., and a particular profile) maintained by the service provider server 130 and/or the digital wallet server 180.

In various implementations, the user 140 is able to input data and information into an input component (e.g., a keyboard) of the user device 110. For example, the user 140 may use the input component to interact with the digital wallet application 112 (e.g., to add a new funding account, to provide information associated with the new funding account, to initiate an electronic payment transaction, etc.).

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

The digital wallet server 180, in one embodiment, may be maintained by a digital wallet service provider for providing digital wallet services. The digital wallet server 180 may provide (e.g., host) the digital wallet application 118 to be downloaded onto mobile devices such as the user device 110. The digital wallet server 180 may also facilitate electronic payment transactions in response to electronic payment transaction requests submitted through the digital wallet application 118.

The token service provider (TSP) server 190, in one embodiment, may be maintained by payment token issuers, such as VISA®, MasterCard®, PayPal®, or other payment token issuers. The TSP server 190 may generate payment tokens (also referred to as tokens herein) for different funding accounts. For example, when the user 140 adds a funding account (e.g., a credit card account, a bank account, gift card, etc.) to the digital wallet application 118, the digital wallet application 118 may submit a token request to the TSP server 190 based on the funding account data received from the user 140. The TSP server 190 may then generate tokens for the funding account. In some embodiments, the TSP server 190 may generate the tokens by encrypting the funding account data. In some embodiments, the TSP server 190 may be part of the service provider server 130.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a token management module 132 that implements the token management system as discussed herein. The token management module 132 is configured to manage payment tokens stored on mobile devices such as the user device 110. In some embodiments, the token management module 132 may interact with the digital wallet application 118, the digital wallet server 180, and the TSP server 190 to manage the tokens that are issued for the digital wallet application 118. For example, when the token management module 132 receives an indication that the user 140 has requested to add a first funding account to the digital wallet application 118, the token management module 132 may determine whether a set of tokens have already been issued and stored on the user device 110 for a related funding account (e.g., a second funding account). If the set of tokens for the second funding account exists on the user device 110, the token management module 132 may cause the TSP server 190 to stop issuing new tokens for the first funding account (which the TSP server 190 would do under normal circumstances). Instead, the token management module 132 may modify characteristics of one or more of the set of tokens existed on the user device 110 to enable the one or more tokens to be usable in electronic payment transactions in association with the first funding account or the second funding account (transforming the tokens to multi-tenant tokens).

Figure 2:
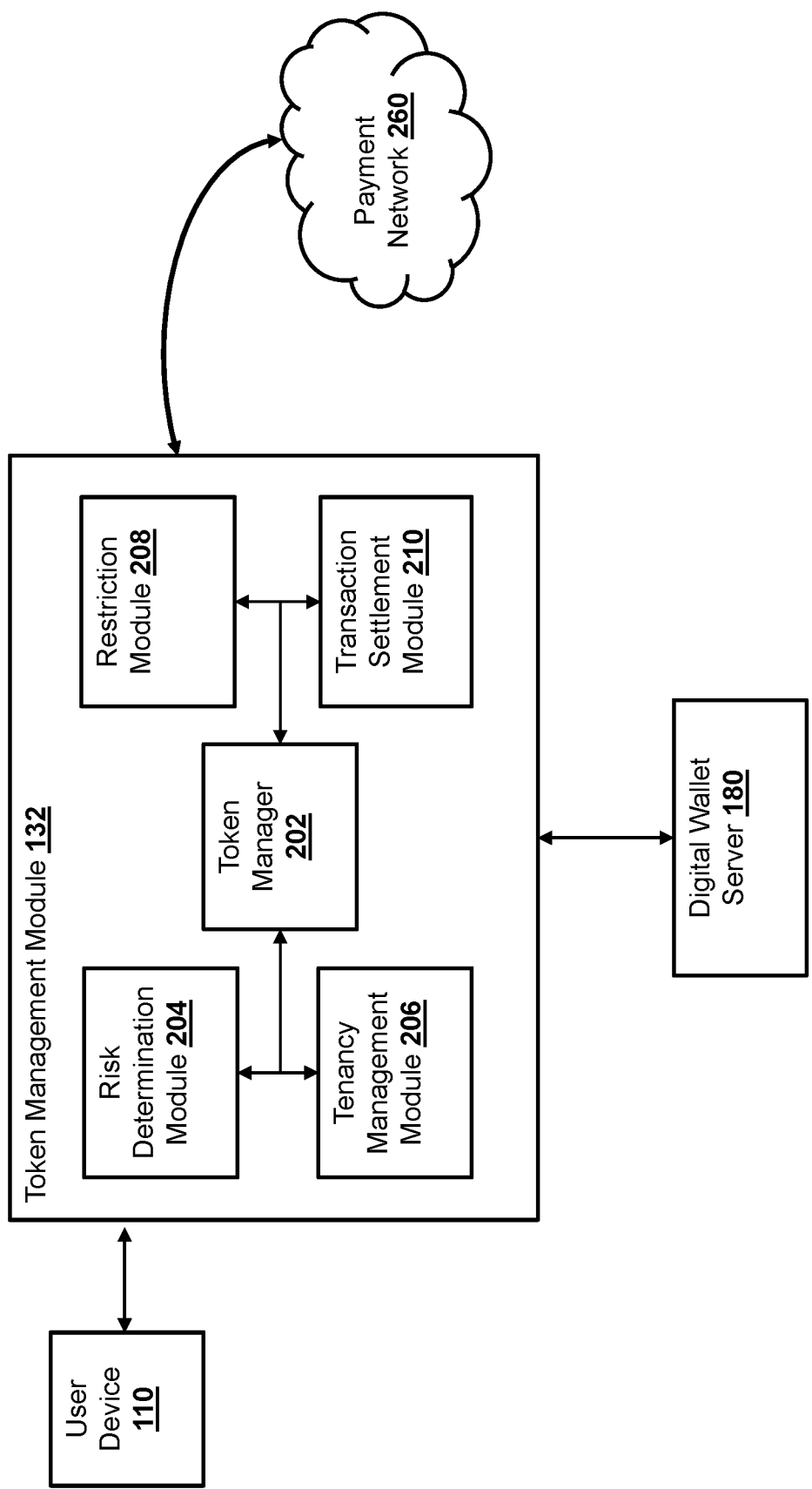
FIG. 2 is a block diagram illustrating a token management module according to an embodiment of the present disclosure.

FIG. 2 illustrates a block diagram of the token management module 132 according to an embodiment of the disclosure. The token management module 132 includes a token manager 202, a risk determination module 204, a tenancy management module 206, a restriction module 208, and a transaction settlement module 210. In some embodiments, the token manager 202 may be in communication with the digital wallet application 118, and may detect that the user 140, through the user device 110, is requesting to add a funding account to the digital wallet application 118. For example, the user 140 may download the digital wallet application 118 from the digital wallet server 180 onto the user device 110. Once the digital wallet application 118 has been downloaded onto the user device 110, the user 140 may begin interacting with the digital wallet application 118 through the user interface generated by the digital wallet application 118 and presented on a display of the user device 110.

Figure 3:
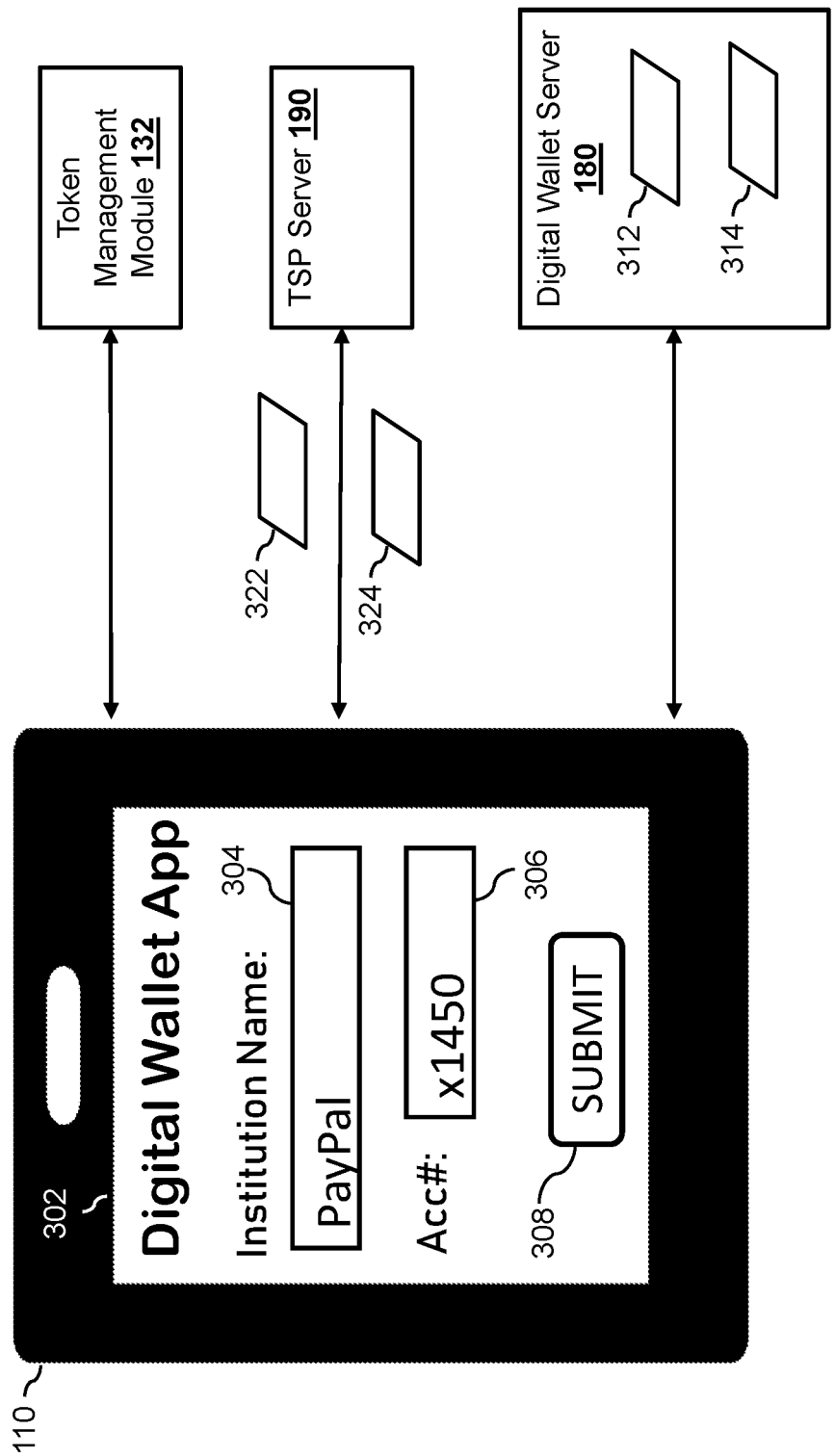
FIG. 3 illustrates an interface of a digital wallet application for facilitating linking of funding accounts to the digital wallet application according to an embodiment of the present disclosure.

Through the user interface of the digital wallet application 118, the user 140 may initiate the process of linking of one or more funding accounts to the digital wallet application 118. For example, the user 140 may initiate the process of linking a funding account to the digital wallet application 118 via a sequence of interfaces of the digital wallet application 118. FIG. 3 illustrates an interface 302 of the digital wallet application presented on the user device 110. The interface 302 enables the user 104 to initiate the process of linking a funding account to the digital wallet application 118. As shown, the interface 302 includes input fields 304 and 306 that enables the user 140 to input funding account data associated with a funding account. The funding account data may include an identity of an institute that provides the funding account (e.g., VISA®, MasterCard®, Wells Fargo Bank, Bank of America, etc.), an account number of the funding account, an expiration date of a card associated with the funding account, a security code associated with the funding account, a number of a gift card, or other types of data associated with the funding account. The user 140 may submit the funding account data to the digital wallet application 180 by selecting the submit button 308. In this example, the user 140 has provided data associated with a funding account 312, which is a PayPal account having an account number that ends with 1450, to the digital wallet application 118 through the interface 302.

Upon receiving the funding account data via the interface 302, the digital wallet application 118 or the digital wallet server 180 may link the funding account 312 to the digital wallet application 118. In some embodiments, the digital wallet application 118 may store the funding account data associated with the funding account 312 within the digital wallet application 118. In some embodiments, the digital wallet application 118 may transmit the funding account data associated with the funding account 312 to the digital wallet server 180, such that the digital wallet server 180 may establish the link between the digital wallet application 118 and the funding account 312. For example, the digital wallet server 180 may store the funding account data associated with the funding account 312 on the digital wallet server 180 in association with an identifier of the digital wallet application 118 installed on the user device 110.

In some embodiments, the digital wallet application 118 and/or the digital wallet server 180 may notify the token manager 202 and the token management module 132 about the linking of the funding account 312 with the digital wallet application 118. Upon receiving the notification, the tenancy management module 206 may determine whether another funding account that is related to the funding account 312 has already been linked to the digital wallet application 118. In some embodiments, the tenancy management module 206 may generate a data structure (e.g., a blockchain, a data record, a database, etc.) for each digital wallet application installed on different devices. Each time a funding account is linked to a digital wallet application, the tenancy management module 206 may generate a new data container (e.g., a new block, a new data record, etc.) that includes the funding account data of the funding account and may add the new data container to the data structure corresponding to the digital wallet application.

Thus, the tenancy management module 206 may first access the data structure corresponding to the digital wallet application 118 installed on the user device 110. The tenancy management module 206 may search the data structure to determine if other funding account(s) linked to the digital wallet application 118 is related to the funding account 312. In this example, since the funding account 312 is the first funding account that is linked to the digital wallet application 118, the tenancy management module 206 may determine that no related funding account has been previously linked to the digital wallet application 118. The token management module 132 may transmit a signal to the digital wallet application 118 and/or the digital wallet server 180 indicating that no related funding account has been previously linked to the digital wallet application 118.

In some embodiments, the token manager 202 may also generate a new data container to store the funding account data of the funding account 312, and may add the data container to the data structure associated with the digital wallet application 118. In some embodiments, the token manager 202 may also use the restriction module 208 to determine a set of restrictions for using the funding account 312 via the digital wallet application. The restriction module 208 may access a transaction history associated with the funding account 312 (e.g., past transactions with the funding account 312 during a historic period of time, such as the past 6 months, the past year, etc.). The restriction module 208 may determine a set of restrictions related to transaction attributes such as a maximum amount, a geographical location, a time of day, etc. based on the transaction history. For example, the restriction module 208 may determine a maximum amount restriction for the funding account 312 based on most of the past transactions (e.g., over a pre-determined threshold such as 90%, 95%, etc.) in the transaction history have a transaction amount below a maximum amount value. The restriction module 208 may determine a location restriction for the funding account 312 based on most of the past transactions (e.g., over a pre-determined threshold such as 90%, 95%, etc.) in the transaction history were conducted within a geographical boundary. The restriction module 208 may also determine a time of day restriction for the funding account 312 based on most of the past transactions (e.g., over a pre-determined threshold such as 90%, 95%, etc.) in the transaction history were conducted within a time range. In some embodiments, the restriction module 208 may determine different time of day restrictions for different merchants, depending on the transaction pattern associated with the funding account. For example, the restriction module 208 may determine a first time of day restriction (e.g., between 8 AM and 11 AM) for a coffee shop and a second time of day restriction (e.g., between 5 PM and 12 AM) for a bar. In some embodiments, the token manager 202 may send the set of restrictions to the user device 110 and may store the set of restrictions (or may cause the digital wallet application 118 to store the set of restrictions) in a data structure (e.g., a table, a database, etc.) on the user device 110.

In some embodiments, based on the signal received from the token management module 132, the digital wallet application 118 or the digital wallet server 180 may transmit a token request to the TSP server 190 to request tokens for the funding account 312. The request may include the funding account data (or at least a portion of the funding account data) associated with the funding account 312. The TSP server 190 may generate (or issue) one or more payment tokens 322 (also referred to simply as "tokens") for the funding account 312 based on the funding account data. In some embodiments, the TSP server 190 may issue each token 322 for the funding account 312 by encrypting (or encoding) at least a portion of the funding account data. Each of the tokens 322 generated by the TSP server 190 may be different from each other. For example, the TSP server 190 may use a variable (e.g., a timestamp, a counter, etc.) as a seed for encrypting (or encoding) the funding account data such that each token is generated to be different than other tokens for the same funding account 312. The TSP server 190 may generate multiple tokens 322 (e.g., 10, 20, etc.) for the funding account 312 at a time. The TSP server 190 may then transmit the tokens 322 to the digital wallet application 118 to be stored on the user device 110.

Figure 4:
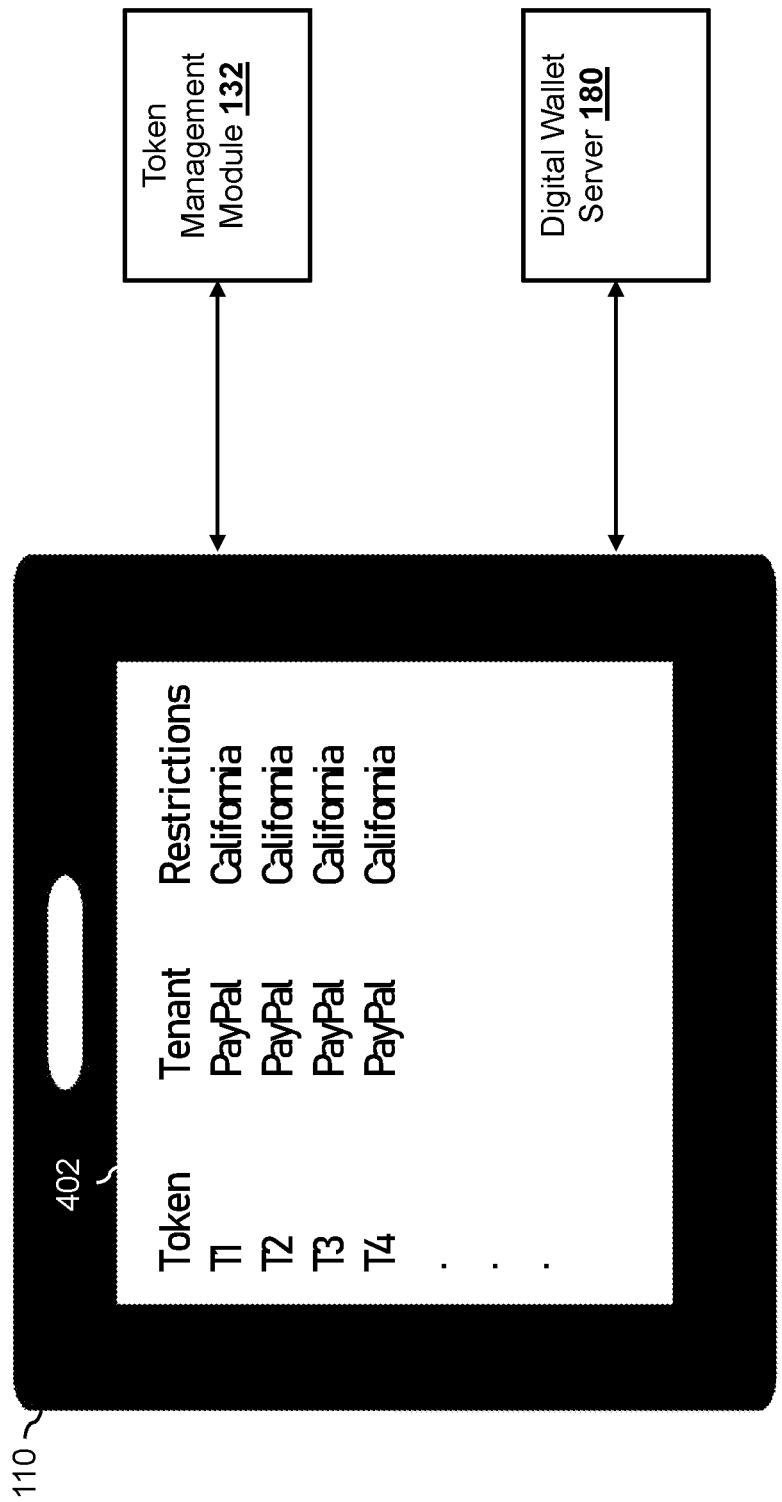
FIG. 4 illustrates an exemplary data structure for storing metadata of a set of tokens on a mobile device according to an embodiment of the present disclosure.

Upon receiving the tokens 322 from the TSP server, the digital wallet application 118 may store the tokens 322 on the user device 110. In addition to storing the tokens 322, the digital wallet application may also store metadata associated with the tokens 322 (e.g., the set of restrictions determined by the restriction module 208, token identifiers, the funding account(s) associated with the tokens, etc.) in a data structure on the user device 110. FIG. 4 illustrates a table 402 generated by the digital wallet application 118 or the token manager 202 for storing metadata associated with tokens stored on the user device 110. As shown, the table 402 includes multiple records. In some embodiments, each record corresponds to a particular token and stores the metadata for that particular token. In this example, the first record stores metadata for the token having a token identifier T1, the second record stores metadata for the token having a token identifier T2, the third record stores metadata for the token having a token identifier T3, the fourth record stores metadata for the token having a token identifier T4, and so forth. Each record stores an identifier of a tenant (e.g., a funding account) and the restriction(s) associated with the token. In this example, since all of the tokens were issued for the funding account 312, the records in the table 302 all have the same information indicating that the tokens are for the funding account 312, and having a location restriction of California.

The tokens 322 can then be used in electronic payment transactions initiated by the user 140 through the digital wallet application 118. For example, the digital wallet application 118 may provide an interface (e.g., a button) that enables the user 140 to initiate an electronic payment transaction using one of the funding accounts that are linked to the digital wallet application 118. When the digital wallet application 118 receives the request to initiate an electronic payment transaction via the interface (e.g., a selection of the button), the digital wallet application 118 may display on the user device 110 a list of all of the funding accounts linked to the digital wallet application 118. In this example, since the funding account 312 is the only funding account linked to the digital wallet application 118, the digital wallet application 118 may display on the user device 110 only information of the funding account 312 (e.g., a name of the institute that provides the funding account and the last 4 digits of the account number). The user 140 may select the funding account 312 for the electronic payment transaction via the interface of the digital wallet application 118. Upon receiving the selection of the funding account 312, the digital wallet application 118 may select, from the tokens stored on the user device, a token (e.g., the token having an identifier T1, etc.) that is associated with the funding account 312 for use in the electronic payment transaction.

In some embodiments, the digital wallet application 118 may access the table 402 stored on the user device 110 to select a token for the electronic payment transaction. For example, the digital wallet application 118 may traverse the records in the table 402 to determine whether any token associated with the funding account 312 is stored on the user device 110. When the digital wallet application 118 identifies one or more tokens stored on the user device 110 and that are associated with the funding account 312, the digital wallet application 118 may determine whether the electronic payment transaction satisfies the restrictions associated with the token(s). For example, the digital wallet application 118 may identify the Token T1 being a token that is associated with the funding account 312 based on the records in the table 402. The digital wallet application may access the restriction data in the record corresponding to the Token T1 and the funding account 312, and may determine that a location restriction of California is associated with the Token T1. The digital wallet application may then analyze the electronic payment transaction, and may determine whether the electronic payment transaction satisfy the restriction associated with the Token T1 (e.g., whether the electronic payment transaction is being conducted within California).

If it is determined that the electronic payment transaction satisfies the restriction, the digital wallet application 118 may initiate processing of the electronic payment transaction by transmitting the Token T1 and transaction data associated with the electronic payment transaction to the token management module 132 and/or the payment network 260. When the token management module 132 receives the Token T1 from the digital wallet application 118, the transaction settlement module 210 may perform additional processing to the Token T1 (e.g., detokenize the Token T1 to extract the funding account data associated with the funding account 312). The transaction settlement module 210 may then transmits the funding account data and the transaction data to the payment network 260 to process the electronic payment transaction.

If it is determined that the electronic payment transaction does not satisfy the restriction associated with the Token T1 (e.g., the electronic payment transaction is conducted outside of California), the digital wallet application 118 may still transmit the Token T1, the transaction data associated with the electronic payment transaction, and a restriction exception (e.g., a soft decline message) to the token management module 132. The risk determination module 204 may determine a risk of the electronic payment transaction. For example, the risk determination module 204 may determine the risk based on other transaction attributes (other than the transaction attribute associated with the restriction) such as the amount, the time of day etc., and the amount of deviation from the restriction (e.g., how far from California, etc.). The token manager 202 may determine to authorize the use of the Token T1 for the electronic payment transaction when the risk is below a threshold, and may deny the use of the Token T1 for the electronic payment transaction when the risk is above the threshold.

The token management system 132 may send a token rejection message to the digital wallet application 118 if the use of the Token T1 for the electronic payment transaction is denied. On the other hand, if the use of the Token T1 for the electronic payment transaction is authorized based on the risk, the transaction settlement module 210 may detokenize the Token T1, and send the funding account data of the funding account 312, and the transaction data to the payment network 260. When a confirmation that the electronic payment transaction is received from the payment network 260, the token manager 202 may send the confirmation to the digital wallet application 118, indicating that the electronic payment transaction has been processed. The digital wallet application 118 may display on the user device 110 the confirmation, and may remove the used token T1 from the user device 110. The digital wallet application 118 may also remove the record corresponding to the Token T1 from the table 402.

As discussed herein, the digital wallet application 118 may allow the user 140 to link multiple funding accounts to the digital wallet application 118. For example, the user 140 may use the interface 302 to initiate the process of linking another funding account (e.g., a funding account 314) to the digital wallet application 118. The funding account 314 may be related to the funding account 312 since the institution providing the funding account 314 (e.g., Venmo) is related to the institution providing the funding account 312 (e.g., PayPal). When the digital wallet application 118 receives the funding account data associated with the funding account 314 from the user 140 via the interface 302, the digital wallet application 118 may send the funding account data to the token management module 132, the digital wallet server 180, and the TSP server 190.

Upon receiving the funding account data of the funding account 314 from the digital wallet application 118, the tenancy management module 206 may determine whether another funding account that is related to the funding account 314 has already been linked to the digital wallet application 118. In some embodiments, the tenancy management module 206 may access the data structure corresponding to the digital wallet application 118 installed on the user device 110. The tenancy management module 206 may search the data structure stored on the service provider server 130 to determine if other funding account(s) linked to the digital wallet application 118 is related to the funding account 314. In this example, the tenancy management module 206 may determine that the funding account 312 is also linked to the digital wallet application 118, and that the funding account 314 is related to the funding account 312 based on the institutions providing the funding accounts 312 and 314, respectively, are related. The tenancy management module 206 may then access the table (e.g., the table 402) on the user device 110 to determine the tokens that have been issued and usable for the funding account 312.

For example, since the Token T1 has already been used and removed from the user device 110, the tenancy management module 206 may determine that Tokens T2, T3, and T4 are still usable for the funding account 312 based on the table 402. In some embodiments, instead of causing the TSP server 190 to issue additional tokens for the funding account 314, the tenancy management module 206 may cause the TSP server 190 to abort issuing new tokens for the funding account 314 and may modify the characteristics of one or more of the tokens (e.g., the Tokens T2, T3, and T4) associated with the funding account 312 such that the one or more of the tokens may be used in electronic payment transactions in association with either the funding account 312 or the funding account 314 (e.g., transforming those tokens into multi-tenant tokens). In some embodiments, the tenancy management module 206 may send a signal to the digital wallet application 118 and the TSP server 190 to abort the issuance of new tokens for the funding account 314. The tenancy management module 206 may also modify the metadata associated with one or more of the Tokens T2, T3, T4 such that some of the tokens may be shared between the funding accounts 312 and 314.

In some embodiments, the tenancy management module 206 may determine a number of tokens among the tokens 322 issued for the funding account 312 to be sharable with the funding account 314. In some embodiments, the tenancy management module 206 may determine that all of the Tokens T2, T3, and T4 issued for the funding account 312 is sharable with the funding account 314. In some embodiments, the tenancy management module 206 may determine that only a subset of the tokens issued for the funding account 312 is sharable with the funding account 314. For example, the tenancy management module 206 may analyze a transaction history of the user 140 with respect to using the funding account 312 and the funding account 314 over a period of time (e.g., the past 6 months, the past year, etc.), based on the transaction data stored in the account database 136. In some embodiments, the tenancy management module 206 may determine a ratio of past transactions conducted by the user 140 through the funding account 312 and the funding account 314, and may determine the number of tokens to be shared between (linked to both) the funding account 312 and the funding account 314 according to the ratio. For example, if the tenancy management module 206 determines that twice as many transactions conducted by the user 140 were through the funding account 312 than the funding account 314, the tenancy management module 206 may determine that only half of the tokens issued for the funding account 312 are shared with the funding account 314. The tenancy management module 206 may then add the funding account identifier of the funding account 314 to the metadata of half of the tokens.

In another example, if the tenancy management module 206 determines that twice as many transactions conducted by the user 140 were through the first funding account than the second funding account based on the transaction data stored in the account database 136, the tenancy management module 206 may determine that more tokens (e.g., twice as many tokens) should be allocated for the funding account 314 than for the funding account 312. In this situation, the tenancy management module 206 may convert at least some of the existing tokens (e.g., 5 out of the 10 existing tokens) from being associated with the funding account 312 to the funding account 314, and may modify the characteristics of the remaining tokens (e.g., the remaining 5 existing tokens) to be shared between the funding account 312 and the funding account 314. Thus, the tenancy management module 206 may remove the funding account identifier of the funding account 312 from the metadata associated with half of the set of tokens and may add the funding account identifier of the funding account 314 to the metadata associated with all of the tokens.

In this example, the tenancy management module 206 may determine that only three fifths of the past transactions were conducted using the funding account 312 and only two fifths of the past transactions were conducted using the funding account 314. Thus, the tenancy management module 206 may modify the metadata associated with the Tokens T2 and T3 only, and does not modify the metadata associated with the Token T4, such that only Tokens T2 and T3 are usable in transactions associated with either the funding account 312 and the funding account 314, while the Token T4 is usable in transactions associated with the funding account 312 only. The tenancy management module 206 may also send a signal to the digital wallet application 118 and/or the TSP server 180 to abort the issuance of additional tokens (e.g., additional 10, 20, 50 tokens, etc.) for the funding account 314.

By enabling the sharing of tokens among different funding accounts, the token management module 132 improves the computer resource efficiency of the user device 110 for facilitating electronic payment transactions. While only three tokens are shown to be associated with the funding account 312 in this example, a larger number of tokens can be generated and associated with the funding account 312 (and each additional funding account) in other examples (e.g., 20, 50, etc.). In these other examples, the improvement in computer resource efficiency is greater as token sharing process implemented by the token management module 132 avoids generation, storage, and management of unnecessary tokens (20, 50, etc.) for each new funding account that is linked to the digital wallet application.

In some embodiments, the tenancy management module 206 may modify the characteristics of a token by changing the associated data (e.g., metadata) of the token. For example, tenancy management module 206 may modify the data records of the table 402 stored on the user device 110. In some embodiments, the tenancy management module 206 may first lock the tokens that require modifications (e.g., Tokens T2 and T3), and may modify the record corresponding to the tokens that require modifications (e.g., Tokens T2 and T3). By locking the tokens, the tokens (e.g., Tokens T2 and T3) may not be used in any transaction by the digital wallet application 118 while the records corresponding to the Tokens T2 and T3 are being modified.

In this example, since the tenancy management module 206 has determined to change the characteristics of the Tokens T2 and T3 to be usable for transactions in association with either the funding account 312 and the funding account 314, the tenancy management module 206 may change the records corresponding to the Tokens T2 and T3 by adding the identifier of the funding account 314 to the records.

Figure 5:
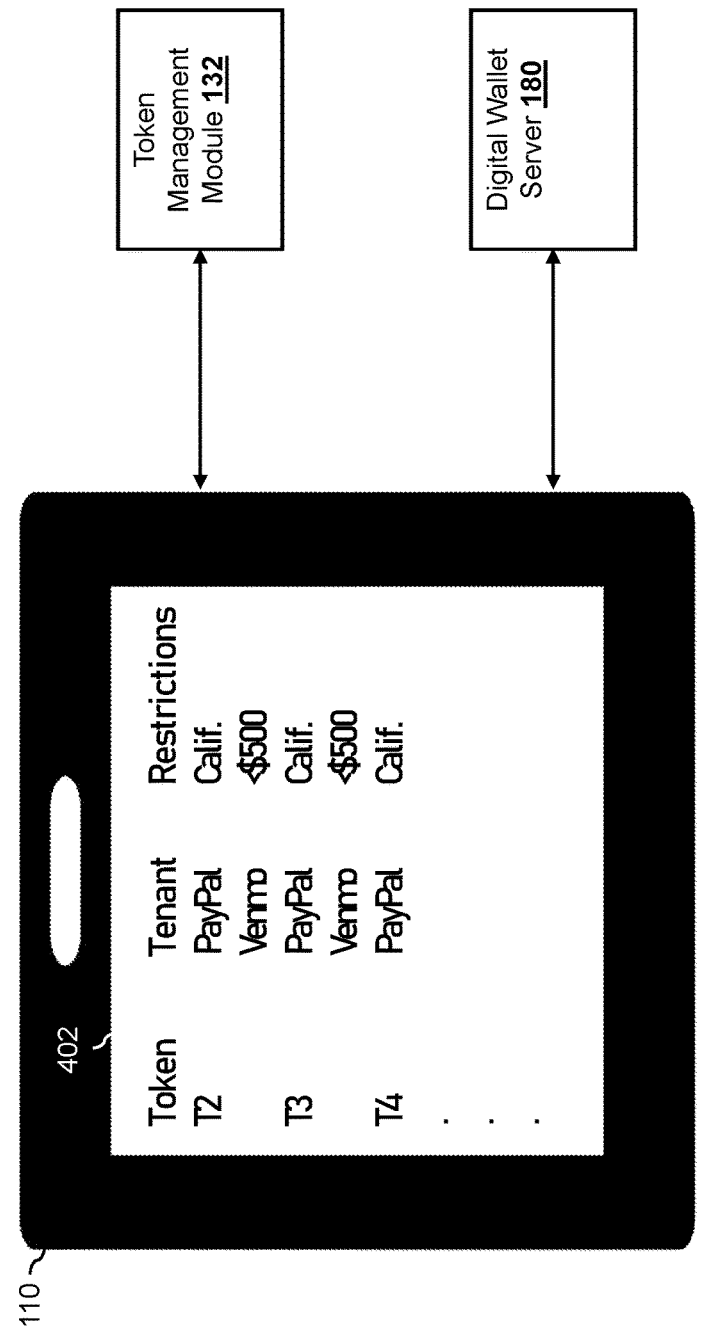
FIG. 5 illustrates modification to the metadata of the set of tokens according to an embodiment of the present disclosure.

FIG. 5 illustrates the table 402 after the records corresponding to the Tokens T2 and T3 have been modified. As shown, each of the records corresponding to the Tokens T2 and T3 include an additional set of metadata indicating the funding account 314 (e.g., Venmo). In some embodiments, the tenancy management module 206 may also use the restriction module 208 to determine a set of restrictions for using the tokens (e.g., Tokens T2 and T3) in association with the funding account 314. In some embodiments, the restriction module 208 may determine the restrictions for using the Tokens T2 and T3 in association with the funding account 314 in a similar manner as determining the restrictions for using the tokens in association with the funding account 312 as discussed herein. For example, the restriction module 208 may determine the restrictions based on a transaction history of the funding account 314.

In some embodiments, due to different past transactions associated with the funding accounts 312 and 314, the restrictions that the restriction module 208 determines for the funding account 314 may be different from the restrictions determined for the funding account 312. For example, while the restriction module determines a location restriction of California for the funding account 312, the restriction module 208 may determine a maximum amount restriction of $500 for the funding account 314. The manner in which the token sharing mechanism implemented by the token management module 132 enables different restrictions to be applied for different funding accounts for the same token. For example, the tenancy management module 206 may insert different restrictions for the funding accounts 312 and 314 in the records corresponding to the Token T2 and T3 in the table 402 as illustrated in FIG. 5.

As shown in FIG. 5, the table 402 indicates that Token T2 can be used in a transaction in association with the funding account 312 (e.g., PayPal) with the restriction that the transaction is conducted in California. The table 402 also indicates that Token T2 can be used in a transaction in association with the funding account 314 (e.g., Venmo) with the restriction that the transaction amount is below $500. The table 402 also indicates that Token T3 can be used in a transaction in association with the funding account 312 (e.g., PayPal) with the restriction that the transaction is conducted in California. The table 402 also indicates that Token T3 can be used in a transaction in association with the funding account 314 (e.g., Venmo) with the restriction that the transaction amount is below $500. The table 402 also indicates that Token T4 can be used in a transaction in association with the funding account 312 (e.g., PayPal) with the restriction that the transaction is conducted in California. The table 402 also indicates that Token T4 cannot be used in a transaction in association with the funding account 314.

After linking the funding account 314 to the digital wallet application 118, the user 140 may initiate an electronic payment transaction using the funding account 314 via the interface 302 of the digital wallet application 118. The digital wallet application 118 may select a token that is associated with the funding account 314 (e.g., Token T2 or Token T3). The digital wallet application 118 may determine whether the electronic payment transaction satisfies the restrictions associated with the selected token for use in association with the funding account 314 (e.g., the transaction amount being less than $500). The digital wallet application 118 may transmit the selected token and transaction data associated with the electronic payment transaction (and possibly a soft decline message if the electronic payment transaction does not satisfy the restrictions) to the token management module 132 to process the electronic payment transaction. After completing the electronic payment transaction (e.g., the digital wallet application 118 receiving a confirmation from the token management module 132 or the payment network 260), the digital wallet application 118 may remove the selected token from the user device 110 and remove the record corresponding to the selected token from the table 402.

When the digital wallet application 118 determines that the number of tokens associated with a particular funding account (e.g., the funding account 312, the funding account 314, etc.) stored on the user device 110 is below a threshold (e.g., less than 1, less than 2, etc.), the digital wallet application may request the TSP server 190 to generate a new batch of tokens (e.g., tokens 324). The TSP server 190 may generate a new batch of tokens 324 (e.g., 10, 20, 50, etc.) for the particular funding account, and may transmit the new batch of tokens 324 to the user device 110.

The digital wallet application 118 may store the new batch of tokens on the user device 110. In some embodiments, the digital wallet application 118 may also send a new token notification to the token management module 132. The token manager 202 may access the table 402 on the user device 110 and add a new record in the table 402 for each token in the new batch of tokens 324. In some embodiments, the token manager 202 may determine if another funding account related to the particular funding account is linked to the digital wallet application 118. For example, if the new batch of tokens 324 is generated for the funding account 312, the token manager 202 may determine that a related funding account (e.g., the funding account 314) is also linked to the digital wallet application 118. The tenancy management module 206 may then modify the records corresponding to the particular funding account in the table 402 to change the characteristics of at least some of the new batch of tokens 324 such that at least some of the new batch of tokens are shared between the funding accounts 312 and 314. The tenancy management module 206 may determine the ratio of tokens that should be shared between the funding accounts 312 and 314 based on the transaction history of the funding accounts 312 and 314, and may modify the records accordingly in the same manner discussed herein.

While the examples discussed above illustrate sharing of tokens between two funding accounts, the token sharing mechanism implemented by the token management module 132 may enable sharing of tokens among more than two funding accounts (3, 5, etc.) using the same techniques described herein. Furthermore, not only the restrictions associated with different funding accounts for a token can be different, the restrictions associated with the same funding account can be different for different tokens as well. Thus, among 5 tokens that can be used in transactions in association with the funding account 312, the tenancy management module 206 may determine that 3 tokens have a location restriction of California and 2 tokens have a maximum amount restriction of less than $1,000. The tenancy management module 206 may store the restrictions in the table 402 accordingly. Thus, when the digital wallet application 118 receives a request for processing an electronic payment transaction using the funding account 312, the digital wallet application may identify a token associated with the funding account 312 having restriction(s) that is satisfied by the electronic payment transaction.

In addition, the token management module 132 may modify the characteristics of the tokens stored on the user device 110 based on other factors such as a risk of one or both of the funding accounts 312 and 314. For example, when it is detected that the risk of the funding account 314 has increased to a value above a threshold (e.g., due to recent fraudulent activities associated with the funding account 314), the token manager 202 may reduce the number of tokens stored on the user device 110 associated with the funding account 314 (or even eliminate all tokens associated with the funding account 314). The token manager 202 may discard (remove) any tokens stored on the user device 110 that are only associated with the funding account 314, and may modify the records corresponding to tokens stored on the user device 110 that are usable by the funding accounts 312 and 314, by removing the association with the funding account 314. In some embodiments, instead of removing tokens associated with the funding account 314, the token manager 202 may impose additional restrictions on the tokens usable by the funding account 314 by modifying the restriction data in the records. By dynamically modifying characteristics of the tokens, the token management module 132 further improve the security of processing electronic payment transactions via the digital wallet application 118.

Figure 6:
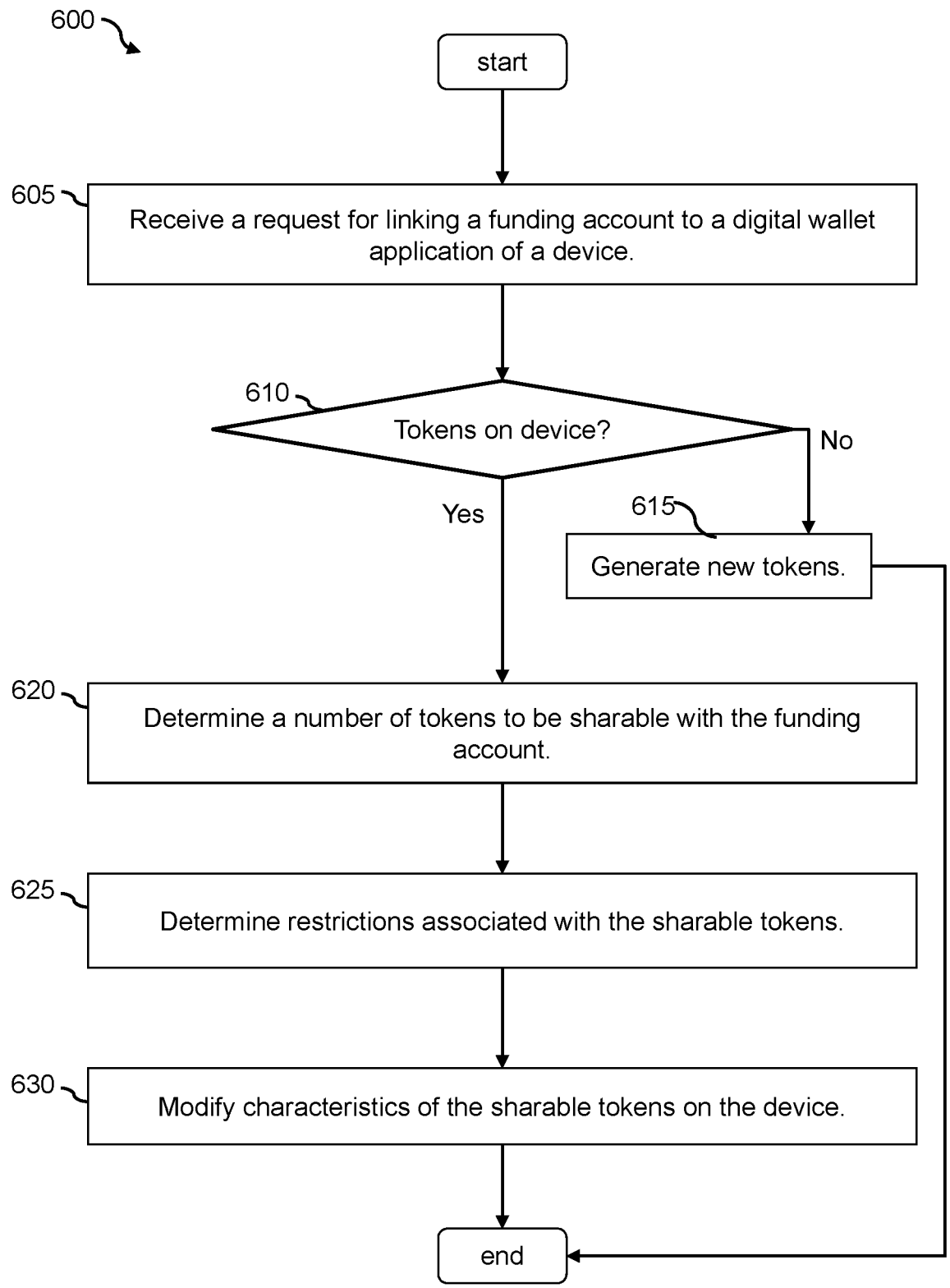
FIG. 6 is a flowchart showing a process of sharing tokens according to an embodiment of the present disclosure.

FIG. 6 illustrates a process 600 for implementing the token sharing mechanism within a digital wallet application according to various embodiments of the disclosure. In some embodiments, at least a portion of the process 600 may be performed by the digital wallet application 118, the token management module 132, and the TSP server 190. The process 600 begins by receiving (at step 605) a request for linking a funding account to a digital wallet application of a device. For example, the digital wallet application 118 may receive a request to link a funding account (e.g., the funding account 312, the funding account 314, etc.) to the digital wallet application 118 via the interface 302. The process 600 then determines (at step 610) whether existing tokens on the device are associated with a related funding account and if there is no existing token associated with a related funding account, the process 600 generates (at step 615) new tokens. For example, the token manager 202 may access the table 402 stored on the user device 110 to determine whether any existing tokens on the user device 110 are associated with a related funding account. When the request is to link the funding account 312 to the digital wallet application 118, the token manager 202 may determine that no other funding account is linked to the digital wallet application 118. The digital wallet application 118 may then request the TSP server 190 to generate a new batch of tokens (e.g., 10 tokens) for the funding account 312 based on the funding account data associated with the funding account 312.

On the other hand, if it is determined that there is at least one existing token associated with a related funding account at step 610, the process 600 determines (at step 620) a number of tokens to be sharable with (linked or otherwise correlated with) the funding account, determines (at step 625) restrictions associated with the sharable tokens (multi-tenant tokens), and modifies (at step 630) the characteristics of the multi-tenant tokens on the device. For example, the tenancy management module 206 may determine the ratio of tokens to be sharable between the funding accounts 312 and 314 (multi-tenant) and the tokens that are non-sharable (single-tenant tokens that are associated with only one of the funding accounts 312 and 314) based on the transaction history of the funding accounts 312 and 314. In some embodiments, the restriction module 208 may also determine restrictions for each one of the tokens that are sharable. The restrictions that are applied to one funding account may be different from restrictions applied to a different account, even for the same token. The tenancy management module 206 may then modify the records corresponding to the sharable tokens in the table 402.

In some embodiments, the restriction module 208 may determine a set of restrictions related to transaction attributes such as a maximum amount, a geographical location, a time of day, etc. based on the transaction history. For example, the restriction module 208 may determine a maximum amount restriction for the funding account 312 based on most of the past transactions (e.g., over a pre-determined threshold such as 90%, 95%, etc.) in the transaction history have a transaction amount below a maximum amount value. The restriction module 208 may determine a location restriction for the funding account 312 based on most of the past transactions (e.g., over a pre-determined threshold such as 90%, 95%, etc.) in the transaction history were conducted within a geographical boundary. The restriction module 208 may also determine a time of day restriction for the funding account 312 based on most of the past transactions (e.g., over a pre-determined threshold such as 90%, 95%, etc.) in the transaction history were conducted within a time range. In some embodiments, the restriction module 208 may determine different time of day restrictions for different merchants, depending on the transaction pattern associated with the funding account. For example, the restriction module 208 may determine a first time of day restriction (e.g., between 8 AM and 11 AM) for a coffee shop and a second time of day restriction (e.g., between 5 PM and 12 AM) for a bar. In some embodiments, the token manager 202 may send the set of restrictions to the user device 110 and may store the set of restrictions (or may cause the digital wallet application 118 to store the set of restrictions) in a data structure (e.g., a table, a database, etc.) on the user device 110.

Figure 7:
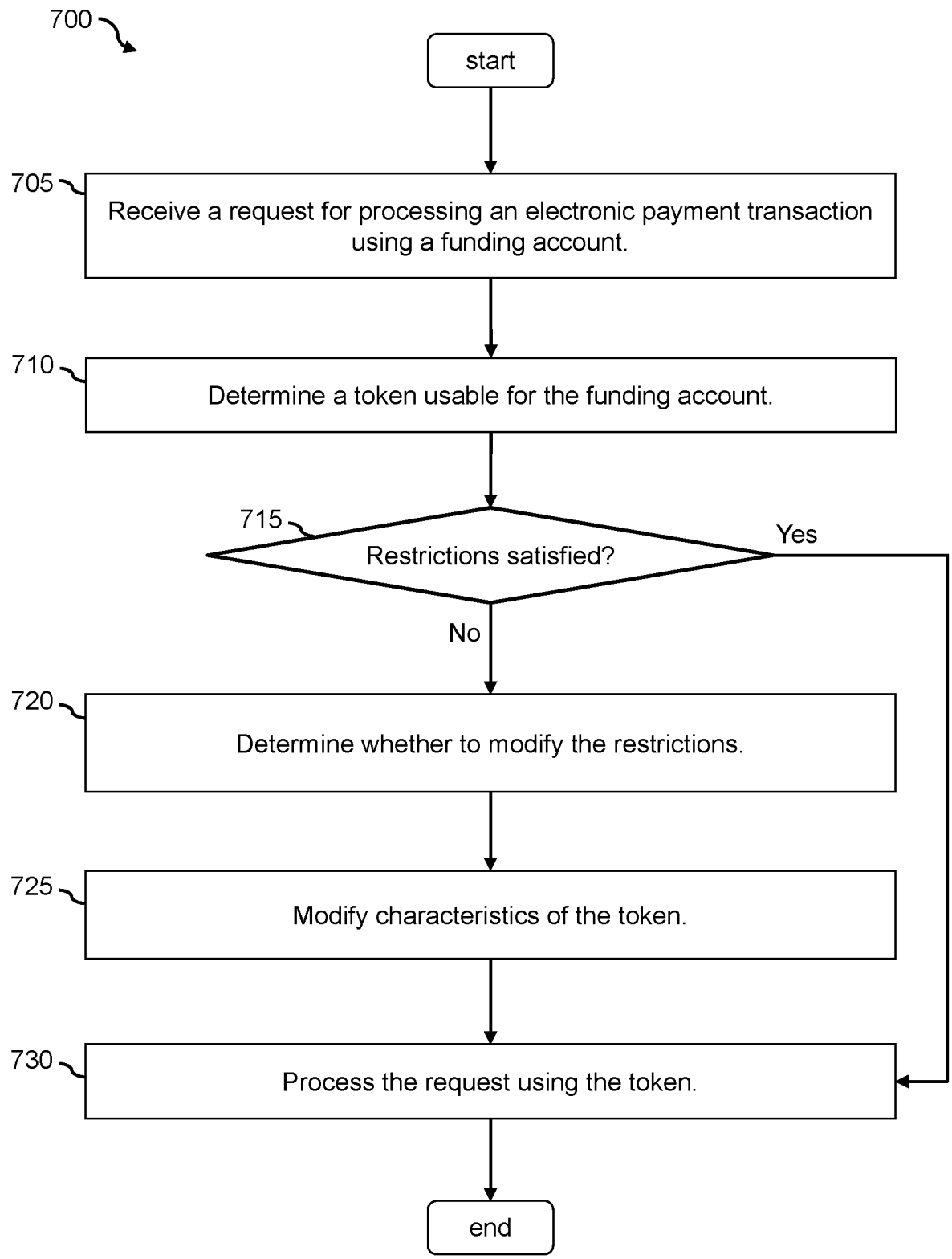
FIG. 7 is a flowchart showing a process of processing an electronic payment transaction according to an embodiment of the present disclosure.

FIG. 7 illustrates a process 700 for dynamically modifying the restrictions associated with a token according to various embodiments of the disclosure. In some embodiments, at least a portion of the process 700 may be performed by the digital wallet application 118 and the token management module 132. The process 700 begins by receiving (at step 705) a request for processing an electronic payment transaction using a funding account. For example, the digital wallet application 118 may receive a request for processing an electronic payment transaction via an interface of the application 118. The user 140 may also select a funding account (e.g., the funding account 314), among the funding accounts linked to the digital wallet application 118, for use in the electronic payment transaction.

The process 700 then determines (at step 710) a token usable for the electronic payment transaction. For example, the digital wallet application 118 may search through the records in the table 400 to identify a token that is associated with the funding account. When multiple tokens can be used in transactions in association with a funding account (e.g., the funding account 312), the token manager 202 may select, among the tokens, a particular token for use in an electronic payment transaction upon receiving a request. Depending on how the tokens were modified and/or allocated by the token management module 132, some of the tokens may be multi-tenant tokens that are shared (or linked) with one or more other funding account (e.g., the second funding account) while some other tokens can be used only in association with the first funding account. Furthermore, different tokens may be associated with different restrictions. Thus, in some embodiments, to select the particular token for use in the electronic payment transaction, the digital wallet application 118 and/or the token management module 132 may first select a subset of tokens having restrictions satisfied by the electronic payment transactions (e.g., whether a time and a merchant associated with the electronic payment transaction satisfy the restrictions associated with the token). In some embodiments, if multiple tokens have restrictions that can be satisfied by the electronic payment transaction, the digital wallet application 118 and/or the token management module 132 may select a token having the most restricted restrictions (e.g., a smallest time range, a smallest geographical region, etc.).

In some embodiments, the digital wallet application 118 and/or the token management module 132 may have a preference of selecting a single-tenant token instead of a multi-tenant token for use in the electronic payment transaction, if possible. Thus, the digital wallet application 118 and/or the token management module 132 may determine whether the subset of tokens includes a single-tenant token, and may select a single-tenant token for use in association with the electronic payment transaction if the subset of tokens includes one. The digital wallet application 118 and/or the token management module 132 may select a multi-tenant token when no single-tenant token exists in the subset of tokens.

The process 700 then determines (at step 715) whether the restrictions associated with the token are satisfied, and if the restrictions are satisfied, the process 700 processes (at step 730) the request using the token. For example, the digital wallet application 118 may select Token T2 for the electronic payment transaction, which has a maximum amount restriction of $500 in association with the funding account 314. If the transaction amount of the electronic payment transaction is below $500 (satisfying the restriction), the digital wallet application 118 may send the Token T2 along with transaction data of the electronic payment transaction to the token management module 132 and/or the payment network 260. The transaction settlement module 210 may detokenize the Token T2 and process the transaction using the funding account data associated with the funding account 314.

However, if it is determined that the restrictions are not all satisfied at step 715, the process 700 determines (at step 720) whether to modify one or more of the restrictions. For example, the risk determination module 204 may determine a risk of the electronic payment transaction based on the transaction data. The restriction module 208 may determine to modify the restriction (e.g., increase the maximum amount, broaden the location, etc.) when the risk is below a threshold. The process 700 then modifies (at step 725) the restrictions of the token and processes (at step 730) the request using the token. For example, the restriction module 208 may modify the restriction (e.g., increasing the maximum amount) such that the electronic payment transaction satisfies the maximum amount restriction. The transaction settlement module 210 may then use the modified token to process the electronic payment transaction. The token manager 202 may send a confirmation to the digital wallet application 118 when the electronic payment transaction is processed.

FIG. 8 is a block diagram of a computer system 800 suitable for implementing one or more embodiments of the present disclosure, including the service provider server 130, the merchant server 120, the digital wallet server 180, the TSP server 190, and the user device 110. In various implementations, the user device 110 may include a mobile cellular phone, personal computer (PC), laptop, wearable computing device, etc. adapted for wireless communication, and each of the service provider server 130, the merchant server 120, the digital wallet server 180, and the TSP server 190 may include a network computing device, such as a server. Thus, it should be appreciated that the devices 110, 120, 130, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the token sharing functionalities described herein according to the processes 600 and 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a user device, a request to link a first funding instrument associated with a first payment service provider to a wallet application of the user device associated with a user, wherein a token provider server of the system is configured to provision one or more first payment tokens for use by the wallet application in association with the first funding instrument based on a linking between the first funding instrument and the wallet application;
determining that one or more second payment tokens have been issued for a second funding instrument associated with a second payment service provider linked to the wallet application, wherein each payment token in the one or more second payment tokens is usable to perform a payment transaction using the second funding instrument, but not the first funding instrument;

determining that the second payment service provider is related to the first payment service provider;

in response to determining that the second payment service provider is related to the first payment service provider, causing the token provider server to abort provisioning the one or more first payment tokens for the wallet application in association with the first funding instrument;

determining a set of payment tokens from the one or more second payment tokens to be shared between the second funding instrument and the first funding instrument based on a historic transaction ratio of transactions processed via a digital wallet server between the first funding instrument and the second funding instrument;

locking the set of payment tokens, wherein the locking the set of payment tokens prevents the digital wallet server from using the set of payment tokens;

while the set of payment tokens is locked, modifying metadata associated with the set of payment tokens that enables the set of payment tokens to be used in association with the first funding instrument or the second funding instrument; and subsequent to the modifying the metadata associated with the set of payment tokens, unlocking the set of payment tokens.

2. The system of claim 1, wherein the modifying the metadata associated with the set of payment tokens is performed without causing additional payment tokens to be issued for the first funding instrument.

3. The system of claim 1, wherein the operations further comprise:

receiving, through the wallet application, an electronic payment request for processing an electronic payment transaction using the first funding instrument;

selecting, from the set of payment tokens stored on the user device, a first payment token for the electronic payment request based on the modified metadata associated with the first payment token; and processing the electronic payment transaction using the first funding instrument based on the first payment token.

4. The system of claim 1, wherein the modifying the metadata associated with the set of payment tokens comprises:

determining a first set of restrictions for using the set of payment tokens in association with the first funding instrument, wherein the first set of restrictions is different from a second set of restrictions for using the set of payment tokens in association with the second funding instrument; and inserting the first set of restrictions into the metadata associated with the set of payment tokens.

5. The system of claim 1, wherein the modified metadata is stored on the user device.

6. The system of claim 4, wherein the first set of restrictions is determined based on a transaction history associated with the first funding instrument.

7. The system of claim 1, wherein the one or more second payment tokens comprise a first number of payment tokens, and wherein the operations further comprise:

determining, for the first funding instrument, a second number of payment tokens to be shared between the first funding instrument and the second funding instrument based on the first number of payment tokens and the historic transaction ratio between the first funding instrument and the second funding instrument.

8. The system of claim 7, wherein a ratio between the second number and the first number corresponds to the historic transaction ratio.

9. A method, comprising:

receiving, from a token provider server, a notification indicating a set of payment tokens have been issued for a first account linked to a wallet application of a device, wherein the first account is associated with a first payment service provider, and wherein each payment token in the set of payment tokens is usable to perform a payment transaction through the first account, but not a second account associated with a second payment service provider;

determining that the second account associated with the second payment service provider is linked to the wallet application;

determining that the first payment service provider is related to the second payment service provider;

in response to determining that the first payment service provider is related to the second payment service provider, causing a token provider server to halt issuing tokens for the wallet application in association with the first account;

determining, from the set of payment tokens issued for the first account, a subset of payment tokens to be shared between the first account and the second account based on a historic transaction ratio of transactions conducted via a digital wallet server between the first account and the second account;

locking the subset of payment tokens, wherein the locking the set of payment tokens prevents the digital wallet server from using the set of payment tokens;

while the subset of payment tokens is locked, modifying metadata associated with the subset of payment tokens, wherein the modifying enables the subset of payment tokens to be used in association with the first account or the second account; and subsequent to the modifying the metadata associated with the subset of payment tokens, unlocking the subset of payment tokens.

10. The method of claim 9, further comprising:

receiving, through the wallet application, an electronic payment request for processing an electronic payment transaction through the second account;

selecting, from the subset of payment tokens stored on the user device, a first payment token for the electronic payment request based on the modified metadata associated with the first payment token;

determining that the modified characteristics specify a restriction in association with using the first payment token for the second account; and determining whether to process the electronic payment transaction through the second account based on the restriction.

11. The method of claim 10, further comprising:

determining that the electronic payment transaction is restricted based on the restriction; and in response to determining that the electronic payment transaction is restricted, denying the electronic payment request.

12. The method of claim 10, further comprising:

determining that the electronic payment transaction is restricted based on the restriction;

in response to determining that the electronic payment transaction is restricted, determining a risk of the electronic payment transaction based on the second a transaction history associated with the second account; and processing the electronic payment transaction through the second account based on the first payment token in response to determining that the risk is below a threshold.

13. The method of claim 12, wherein the operations further comprise:
in response to determining that the risk is below a second threshold, modifying the restriction in association with using the subset of payment tokens for the second account.

14. The method of claim 9, further comprising:
generating the metadata for the set of payment tokens based on the first account.

15. The method of claim 9, further comprising:
determining that a number of existing payment tokens stored on the user device is below a threshold; and
transmitting a token request in response to determining that the number of existing payment tokens is below the threshold.

16. A non-transitory machine-readable medium having stored therein machine-readable instructions executable to cause a machine to perform operations comprising:
receiving a request to link a first payment account associated with a first payment service provider to a wallet application of a user device associated with a user;
determining that a set of payment tokens have been issued for a second payment account associated with a second payment service provider linked to the wallet application, wherein each payment token in the set of payment tokens is usable to perform a payment transaction through the second payment account, but not the first payment account;
determining that the second payment service provider is related to the first payment service provider;
in response to determining that the second payment service provider is related to the first payment service provider, preventing a token provider server from issuing tokens for the wallet application in association with the first payment account;
determining, from the set of payment tokens, a subset of payment tokens to be shared between the second payment account and the first payment account based on a historic transaction ratio of transactions conducted via a digital wallet server between the first payment account and the second payment account;
locking the subset of payment tokens, wherein the locked subset of payment tokens is unusable by a digital wallet server for conducting any payment transaction;
while the subset of payment tokens is locked, modifying metadata associated with the subset of payment tokens to enable the subset of payment tokens to be used in association with the first payment account or the second payment account; and subsequent to the modifying the metadata associated with the subset of payment tokens, unlocking the subset of payment tokens.

17. The non-transitory machine-readable medium of claim 16, wherein the operations further comprise:
receiving, through the wallet application, an electronic payment request for processing an electronic payment transaction through the first payment account;
selecting, from the subset of payment tokens stored on the user device, a first payment token for the electronic payment request based on the modified metadata associated with the first payment token; and
processing the electronic payment transaction through the first payment account using the first payment token.

18. The non-transitory machine-readable medium of claim 16, wherein the modifying the characteristics comprises:
determining a first set of restrictions for using a first payment token, from the subset of payment tokens, in association with the first payment account, wherein the first set of restrictions is different from a second set of restrictions for using the first payment token in association with the second payment account; and
inserting the first set of restrictions into a data record in association with the first payment token.

19. The non-transitory machine-readable medium of claim 18, wherein the operations further comprise:
receiving, through the wallet application, an electronic payment request for processing an electronic payment transaction through the first payment account;
selecting, from the subset of payment tokens stored on the user device, a first payment token for the electronic payment request based on the modified metadata associated with the first payment token;
determining that the modified characteristics specify a restriction in association with using the first payment token for the first payment account; and
processing the electronic payment transaction through the first payment account based on the restriction.

20. The non-transitory machine-readable medium of claim 19, wherein the operations further comprise:
determining that the electronic payment request is restricted based on the restriction;
in response to determining that the electronic payment transaction is restricted, determining a risk of the electronic payment transaction based on a first transaction history associated with the first payment account; and
processing the electronic payment request through the first payment account using the first payment token in response to determining that the risk is below a threshold.

* * * * *

UNITED STATES PATENT AND TRADEMARK OFFICE
CERTIFICATE OF CORRECTION

PATENT NO. : 11,868,990 B2
APPLICATION NO. : 17/003682
DATED : January 9, 2024
INVENTOR(S) : Pankaj Sarin It is certified that error appears in the above-identified patent and that said Letters Patent is hereby corrected as shown below:

In the Claims

Claim 12, Column 27, Line 1, change "based on the second a" to --based on a--.

Signed and Sealed this
Twelfth Day of March, 2024

*Katherine Kelly Vidal*

Katherine Kelly Vidal
*Director of the United States Patent and Trademark Office*